(No Model.)
L. McKINNISS.
MANUFACTURE OF PLOWSHARES.
No. 258,938. Patented June 6, 1882.
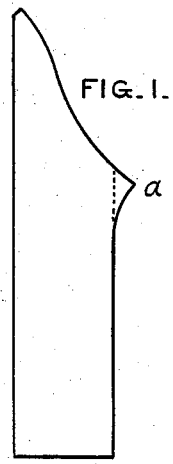
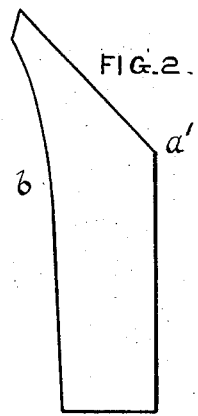
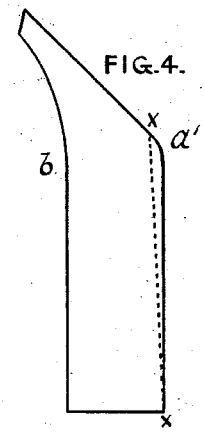
Witnesses
Bradford Cross
S. S. Ewing
Inventor
Louis McKinniss
By L. P. Graham
atty

UNITED STATES PATENT OFFICE.

LEWIS McKINNISS, OF DECATUR, ILLINOIS, ASSIGNOR OF ONE-HALF TO JOSEPH S. TAIT AND FELIX B. TAIT, OF SAME PLACE.

MANUFACTURE OF PLOWSHARES.

SPECIFICATION forming part of Letters Patent No. 258,938, dated June 6, 1882.

Application filed October 15, 1881. (No model.)

*To all whom it may concern:*

Be it known that I, LEWIS McKINNISS, a resident of the city of Decatur, county of Macon, and State of Illinois, have invented certain new and useful Improvements in Plowshares, of which the following is a specification, and which has never been patented to me, nor to others with my knowledge and consent, in any foreign country.

In making even a general statement of my invention and the object to be attained it will be necessary to refer to the drawings and to the state of the manufacture to which my device relates.

In the drawings, Figure 1 represents a blank plowshare as I construct them, the dotted line at $a$ indicating the form heretofore given and over which I claim an improvement. To form a plowshare of this blank it is "stoved down" or bent into the shape shown in Fig. 2, which represents a plowshare complete as I construct it, Fig. 3 showing an edge or back view of the same. This process of stoving down, when performed on a blank minus my improvement, has the effect of thinning the metal at this point and leaving the share in the shape shown in Fig. 4. To correct this shape it has been found necessary to trim the metal to dotted line $x x$, which still leaves a defect in the finished plowshare by narrowing the same at $b$, a point where the greatest width is needed, and by leaving the metal at $a'$ too thin to weld to the landside without going through a still further process of "double shinning," or welding a piece to the surface, in order to thicken it.

By the use of a blank with my improvement the stoving-down process leaves the plowshare widest at $b$ without exhausting the extra metal, which is further used to thicken this point, as shown in Fig. 3, thus making it an easy matter to weld to the landside, besides leaving the share more durable.

In plowshares as heretofore made the metal at point $a'$ is usually thinner than the moldboard, so that it has been necessary to let the latter down into the landside in order to form a continuous surface. This disadvantage my device also overcomes, as will be readily seen in Fig. 3.

Having thus described my invention and its effect on the manufacture to which it relates, I claim as new and desire to secure by Letters Patent—

The within-described method of manufacturing plowshares, consisting in making the blank with a bold projection, $a$, at a point opposite the concave $b$, and then stoving down said projection, thereby widening and strengthening the share in the concave $b$, substantially as set forth.

LEWIS McKINNISS.

Attest:
WM. T. CUSSINS,
W. I. WALKER.